(12) United States Patent
Bruford et al.

(10) Patent No.: US 7,267,387 B1
(45) Date of Patent: *Sep. 11, 2007

(54) PIVOTED LOCK ROD SUPPORTS FOR SUPPLEMENTAL VEHICLE TAILGATE

(75) Inventors: Steve Bruford, West Bloomfield, MI (US); Scott Miller, Canton, MI (US); Kian-Huat Tan, Westland, MI (US); Herbert Gruber, Rochester Hills, MI (US); David Tuck, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 129 days.

This patent is subject to a terminal disclaimer.

(21) Appl. No.: 11/230,679

(22) Filed: Sep. 20, 2005

Related U.S. Application Data

(63) Continuation-in-part of application No. 10/969,262, filed on Oct. 20, 2004, now Pat. No. 6,966,595.

(60) Provisional application No. 60/515,521, filed on Oct. 29, 2003, provisional application No. 60/515,370, filed on Oct. 29, 2003.

(51) Int. Cl.
*B62D 33/03* (2006.01)

(52) U.S. Cl. .................................... 296/57.1; 296/26.1

(58) Field of Classification Search ............... 296/57.1, 296/26.08, 26.09, 26.1, 26.11; 224/402, 224/403, 405
See application file for complete search history.

(56) References Cited

U.S. PATENT DOCUMENTS 6,082,801 A * 7/2000 Owen et al. ............. 296/26.11

* cited by examiner

*Primary Examiner*—Joseph D Pape
(74) *Attorney, Agent, or Firm*—Gigette Bejin; Miller Law Group, PLLC

(57) ABSTRACT

A supplemental tailgate extends from the tailgate frame of a pickup truck and is positionable in multiple orientations to provide a variety of uses, including as an extension of the pickup truck bed. The supplemental tailgate includes a cross member connected between two telescoping supports, which forms a part of the tailgate molding when stored within the main tailgate structure. A lock rod assembly interconnects the supplemental tailgate and the body of the pickup truck to stabilize the position of the extended supplemental tailgate when positioned perpendicular to the opened main tailgate. The lock rod assembly can be formed as flexible cables that can be housed within the cross member for easy deployment when needed. The lock rod assembly can also be formed as fixed length rods that are pivotally mounted on the cross member and stored within the cross member for easy deployment.

23 Claims, 16 Drawing Sheets

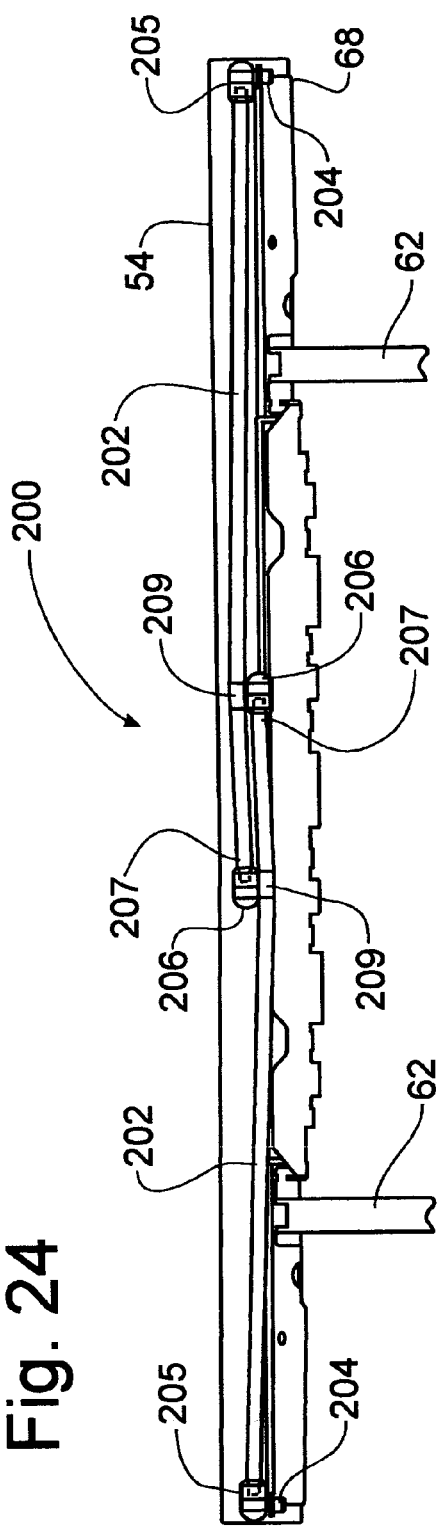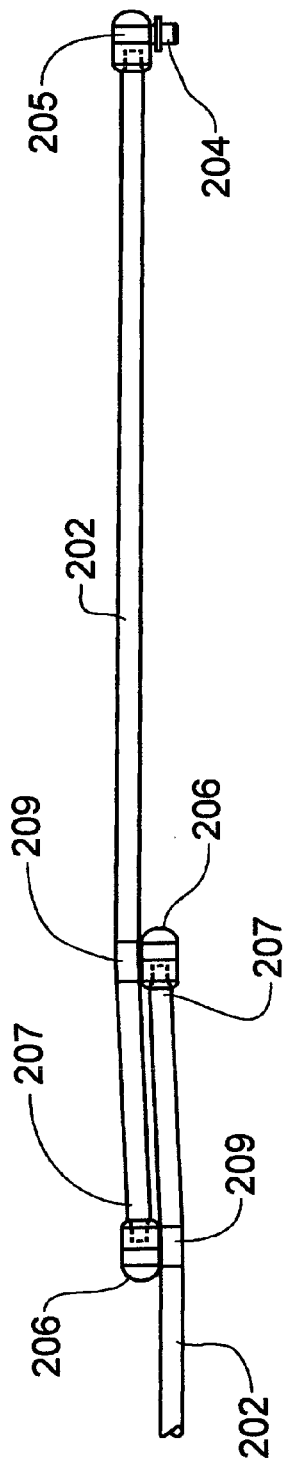

PIVOTED LOCK ROD SUPPORTS FOR SUPPLEMENTAL VEHICLE TAILGATE

CROSS-REFERENCE TO RELATED APPLICATIONS

This application claims the benefit of United States provisional patent applications identified as Application No. 60/515,521, filed Oct. 29, 2003, and Application No. 60/515,370, filed Oct. 29, 2003, through the parent application identified below, and are both provisional applications are incorporated herein by reference. This application is a continuation-in-part of U.S. patent application Ser. No. 10/969,262, filed Oct. 20, 2004, issued as U.S. Pat. No. 6,966,595 on Nov. 22, 2005.

FIELD OF THE INVENTION

The present invention relates to vehicle tailgates, and, more particularly, to tailgates for use on pickup trucks and having a supplemental tailgate assembly that is extendable therefrom

BACKGROUND OF THE INVENTION

Conventionally, pickup trucks include a tailgate at the back of a bed that closes off a cargo box. Often times, the truck bed is not long enough to hold the cargo, so truck bed extenders have been developed. The truck bed extenders work in conjunction with the open tailgate in order to provide additional length to the bed. Some of the bed extenders mount to the outside of the tailgate or to the box itself, which may be convenient for deployment, but they tend to interfere with cargo space in the box since the bed extender, when not in use, protrudes into the box. Moreover, it is typical for the vehicle operator to employ the extender only occasionally, so it is generally undesirable to have the extender exposed at all times, which detracts from the attractiveness of the vehicle.

Additionally, it is sometimes desirable to have an extender that can provide other functions in addition to a bed extender, such as a box extender function—an upwardly extending structure from the rearmost edge of an open tailgate that mimics the function of a closed tailgate. Such arrangements are particularly useful for carrying a load that is longer than the bed, but needs rearward support like a closed tailgate provides in order to prevent the load from falling backwards off the truck. Again, though, typical box extenders that provide adequate functionality are externally mounted and not only detract from the vehicle appearance when not in use but also require changes to the box for mounting such extenders. Also, most of these types of extenders are very cumbersome to deploy and later stow away, thus being undesirable for the operator to use. Such functions may be provided with simple ergonomic operation of the assembly, while still allowing for an attractive appearance for the vehicle when the extender is stowed during periods of non-use. Thus, while the exterior mounted extenders may be able to perform multiple functions, they still suffer from the drawbacks of an unattractive appearance and taking up room in the bed even when not in use.

Another drawback with common bed extenders is that a desirable feature of conventional tailgates may be lost. That is, a conventional tailgate has an ornamental plastic tailgate molding mounted along its top surface. It is meant to provide a surface along which cargo can be slid into the bed without the concern of rusting due to paint being scraped off. Some bed extender designs interfere with or cause the elimination of this molding, further detracting from the appearance of the vehicle.

Positioning the extended supplemental tailgate structure generally perpendicularly to the plane of the mail tailgate structure, while the main tailgate structure is moved to an open position such that the plane of the tailgate structure is substantially parallel to the bed of the pickup truck, places the extended supplemental tailgate structure in an orientation that is substantially parallel to the main tailgate structure when the main tailgate structure is in a normal closed position. In such an extended position, the supplemental tailgate can provide a restriction to the rearward movement of objects located on the bed of the pickup truck. Furthermore, such an extended position of the supplemental tailgate can provide support for objects placed on top of the supplemental tailgate. The extended supplemental tailgate, however, has a limited support structure on the main tailgate and would have enhanced stability if support members were provided to extend between the extended supplemental tailgate and the body of the pickup truck.

Thus, it is desirable to have a vehicle tailgate with a bed extender that overcomes the drawbacks of the prior art, and particularly is provided with support members interconnecting the bed extender structure and the body of the pickup truck.

SUMMARY OF THE INVENTION

In its embodiments, the present invention contemplates a tailgate assembly for use with a motor vehicle having a pair of spaced, generally vertical side walls and a generally horizontal bed extending therebetween. The tailgate assembly has a tailgate frame, including a rear panel and a front panel, adapted to pivotally mount generally between the side walls and being operable in a generally horizontal open position. The tailgate assembly also may have a supplemental tailgate including a guide system secured generally between the rear panel and the front panel, a movable frame assembly having two telescoping supports extendable from, pivotable relative to and retained by the guide system, and a cross member connected to the two telescoping supports and extending therebetween and including a first end and an opposed second end. The supplemental tailgate also includes a lock rod assembly telescopically extendable from and pivotable relative to the first end of the cross member, with the lock rod assembly including a lock rod bar having a lock rod latch affixed thereto that is adapted to releasably latch to one of the pair of side walls to thereby support the movable frame portion relative to the guide system when the tailgate frame is in the generally horizontal open position and the movable frame assembly is pivoted upward relative to the tailgate frame.

An embodiment of the present invention also contemplates a supplemental tailgate assembly for use with a vehicle tailgate having a tailgate frame forming a generally hollow cavity therein. The supplemental tailgate assembly includes a guide system adapted to be secured generally within the hollow cavity of the tailgate, and a movable frame assembly having two telescoping supports extendable from and retained by the guide system, a cross member connected to the two telescoping supports and extending generally therebetween and including a first end and an opposed second end. The supplemental tailgate assembly may also include a lock rod assembly having a first lock rod bar that is telescopically extendible from and pivotable relative to the first end of the cross member and includes a first lock rod latch affixed thereto, and a second lock rod bar that is telescopically extendable from and pivotable relative to the second end of the cross member and includes a second lock rod latch affixed thereto.

An advantage of an embodiment of the present invention is that the supplemental tailgate is relatively simple mechanically, yet provides sturdy support for aft directed cargo loads. Moreover, the supplemental tailgate may be quickly and easily moved into a box extender position as well as retracted into the stowed position when no longer needed. This is all accomplished while minimizing potential jamming or other issues that may arise from long term use.

Another advantage of an embodiment of the present invention is that the supplemental tailgate, when in its retracted position during times of nonuse, will not detract from the attractiveness of the vehicle. Moreover, it can closely match the look of tailgates for similar trucks that do not have a supplemental tailgate, thus allowing for essentially the same appearance across that particular line of trucks. And, the use of a vehicle tailgate containing the supplemental tailgate may not generally require any modifications or additions to the vehicle itself, just the switch to a different vehicle tailgate assembly.

An additional advantage of an embodiment of the present invention is that the highly ergonomic and esthetically pleasing supplemental tailgate assembly still allows for a multi-function bed extender. This supplemental tailgate assembly may be moved to different positions in order to be employed to extend the bed, extend the box, and operate as an assist step.

A further embodiment of the invention provides a support structure that is formed by flexible members that are housed within the supplemental tailgate structure and positioned to be deployed between the supplemental tailgate and the D-pillar of the pick-up truck body. Such flexible supplemental tailgate supports provide support against a loading on the supplemental tailgate that would urge the supplemental tailgate rearwardly.

It is an advantage of this invention that the deployment of support members interconnecting the supplemental tailgate and the pickup truck body is facilitated.

It is another advantage of this invention that the storage of the support members is provided to retract the support members from view when not deployed, yet permit the support members to be easily accessed for deployment as needed.

It is a further object of this invention to provide easily deployed support members interconnecting a supplemental tailgate structure and the body of a pickup truck to enhance the operative stability of the supplemental tailgate structure that is durable in construction, inexpensive of manufacture, carefree of maintenance, facile in assemblage, and simple and effective in use.

These and other objects, features and advantages are accomplished according to the instant invention by providing a supplemental tailgate that extends from the tailgate frame of a pickup truck and is positionable in multiple orientations to provide a variety of uses, including as an extension of the pickup truck bed. The supplemental tailgate includes a cross member connected between two telescoping supports, which forms a part of the tailgate molding when stored within the main tailgate structure. A lock rod assembly interconnects the supplemental tailgate and the body of the pickup truck to stabilize the position of the extended supplemental tailgate when positioned perpendicular to the opened main tailgate. The lock rod assembly can be formed as flexible cables that can be housed within the cross member for easy deployment when needed. The lock rod assembly can also be formed as fixed length rods that are pivotally mounted on the cross member and stored within the cross member for easy deployment.

BRIEF DESCRIPTION OF THE DRAWINGS

The advantages of this invention will become apparent upon consideration of the following detailed disclosure of the invention, especially when taken in conjunction with the accompanying drawings wherein:

FIG. 24 is a partial elevational view of the supplemental tailgate structure having pivotally mounted therein an alternative lock rod apparatus oriented in the stored position;

FIG. 25 is an enlarged partial elevational view of the lock rod members depicted in FIG. 24;

DETAILED DESCRIPTION OF THE PREFERRED EMBODIMENT

Figure 1:
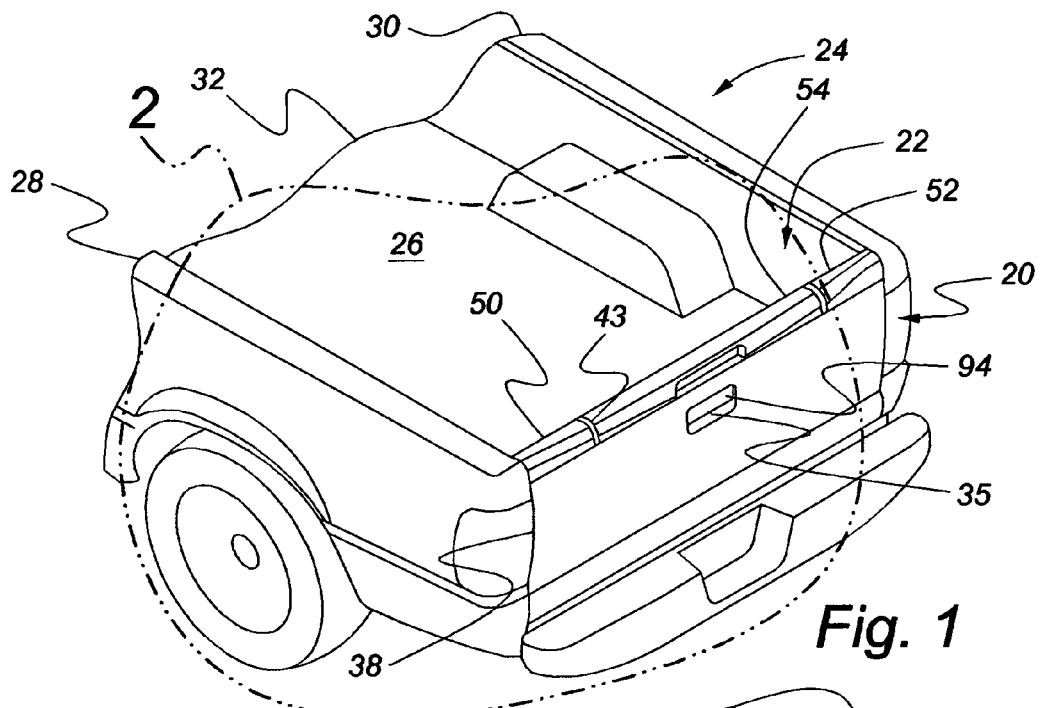
FIG. 1 is a perspective view of a rear portion of a vehicle incorporating a tailgate, with the tailgate shown in a generally vertical, closed position, in accordance with the present invention.
Figure 2:
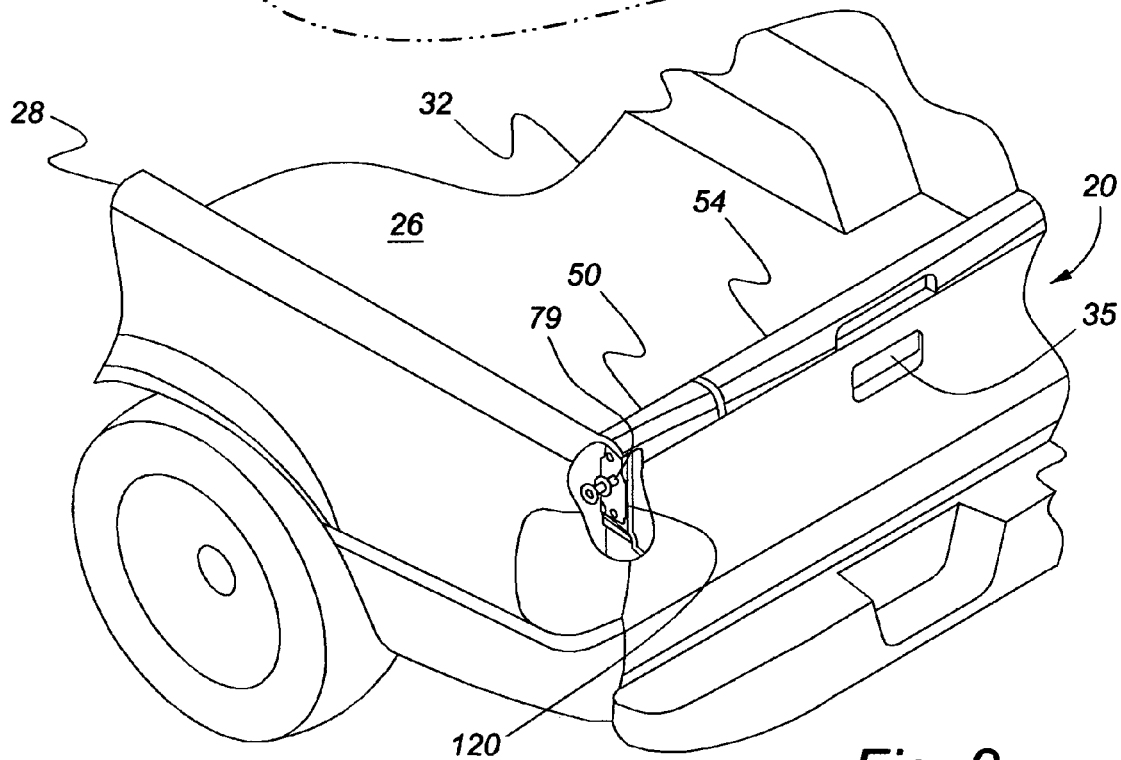
FIG. 2 is a rear perspective view, on an enlarged scale, of encircled area 2 in FIG. 1.
Figure 3:
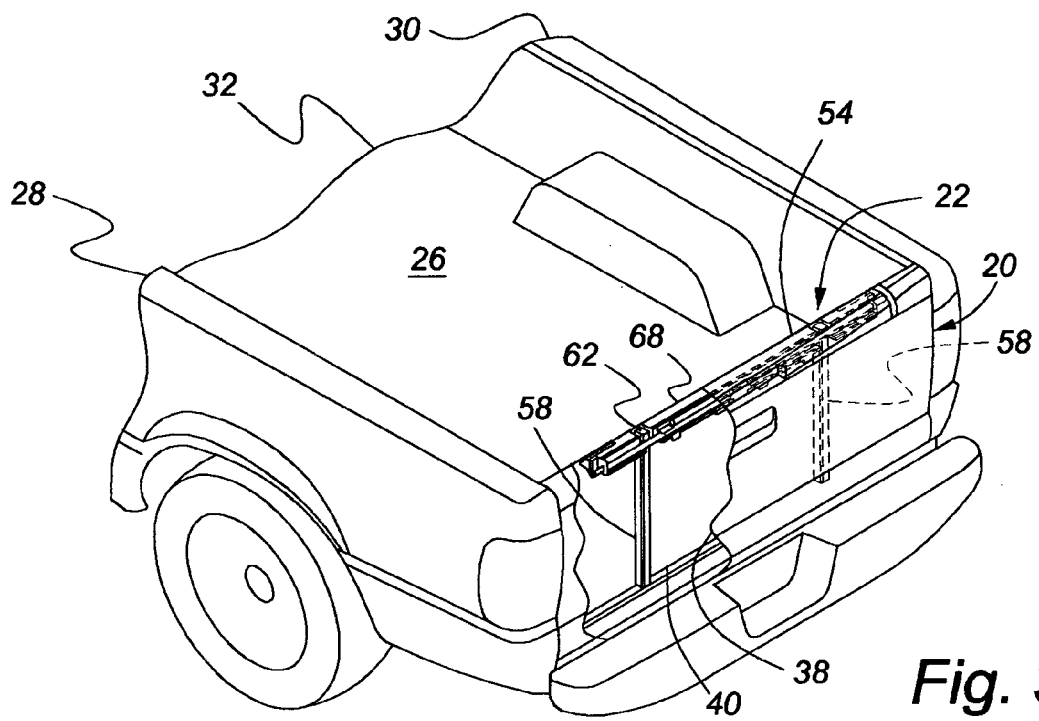
FIG. 3 is a partially cutaway perspective view similar to FIG. 2, with the cutaway area revealing the supplemental tailgate structure retracted into its stowed position within the vehicle tailgate.
Figure 4:
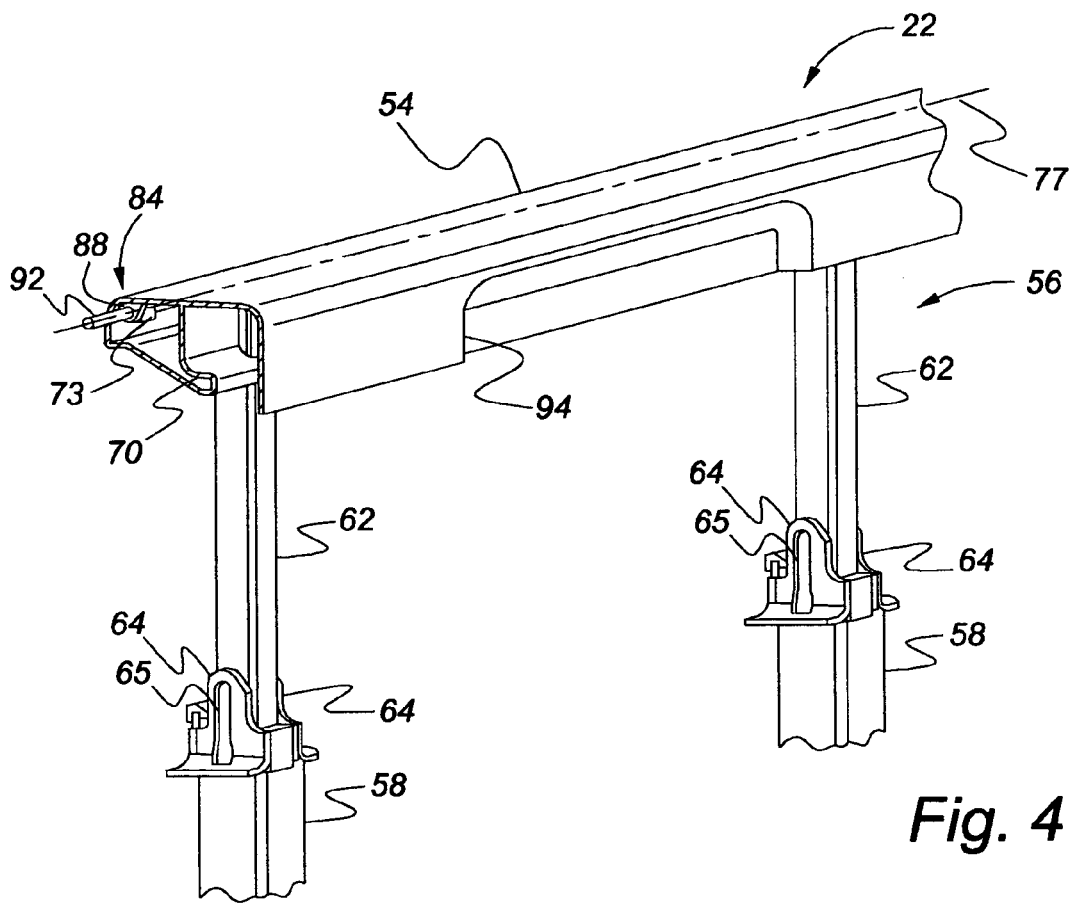
FIG. 4 is a rear perspective, partially sectioned view of the supplemental tailgate in accordance with the present invention.
Figure 5:
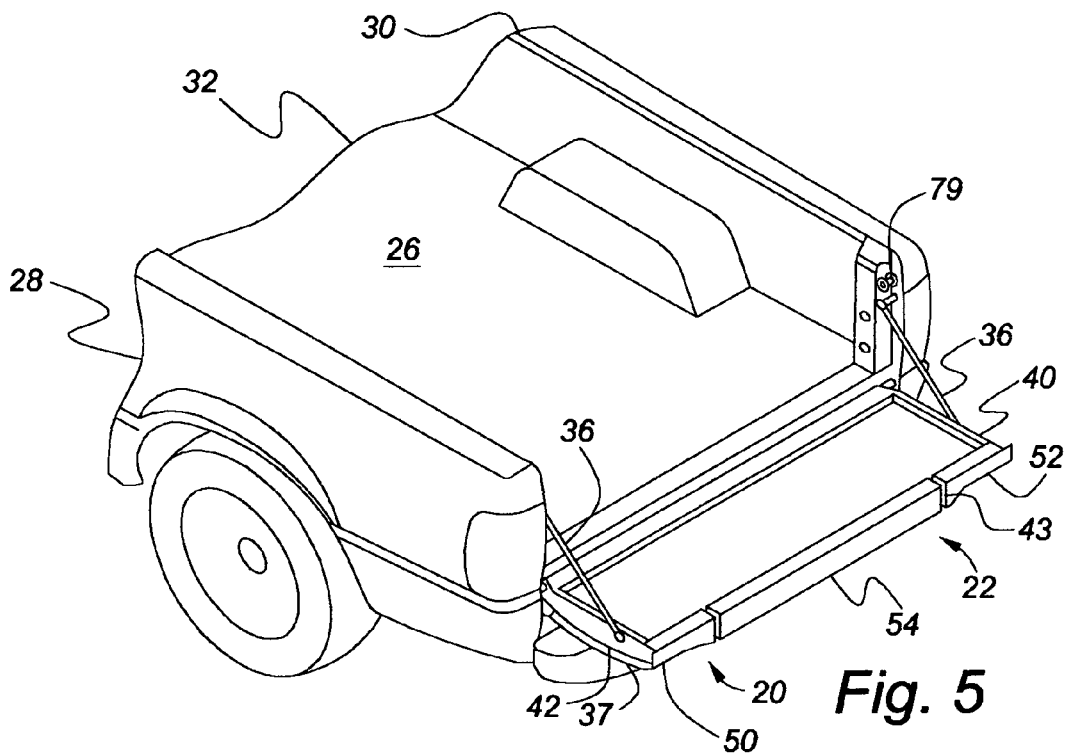
FIG. 5 is a partial perspective view similar to FIG. 1, but with the tailgate shown in its open, generally horizontal position.
Figure 6:
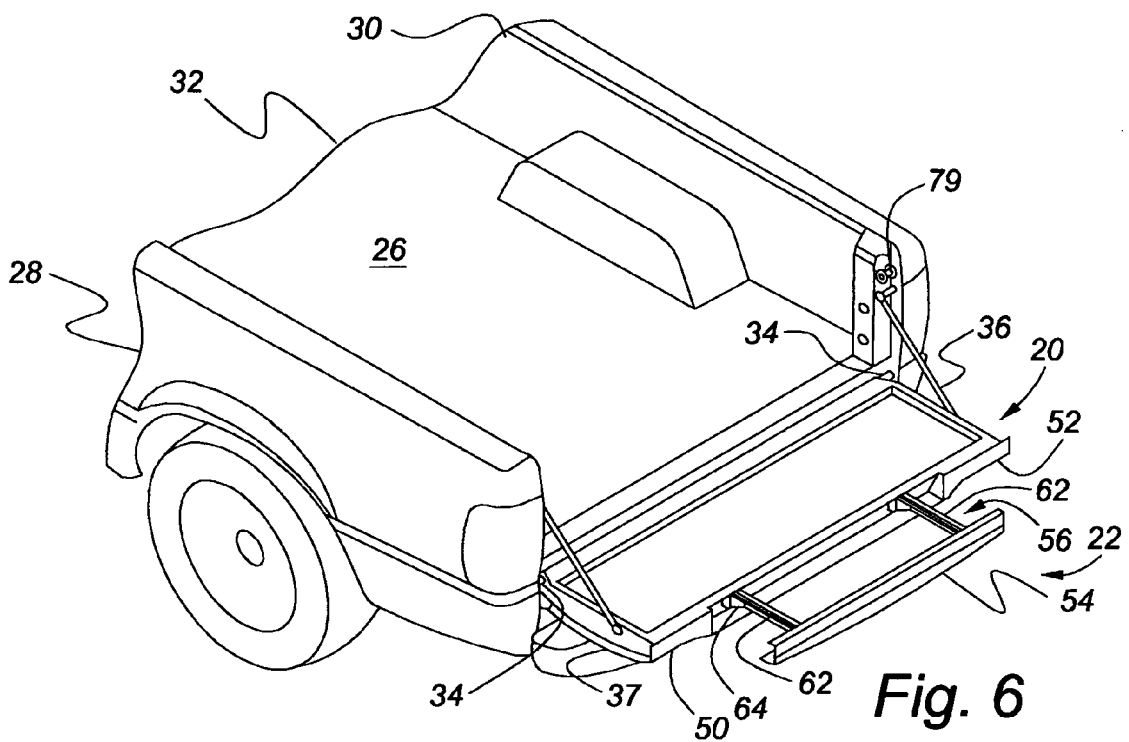
FIG. 6 is a partial perspective view similar to FIG. 5, but with the supplemental tailgate shown in a partially extended position, and with the vehicle tailgate in its open, generally horizontal position.
Figure 7:
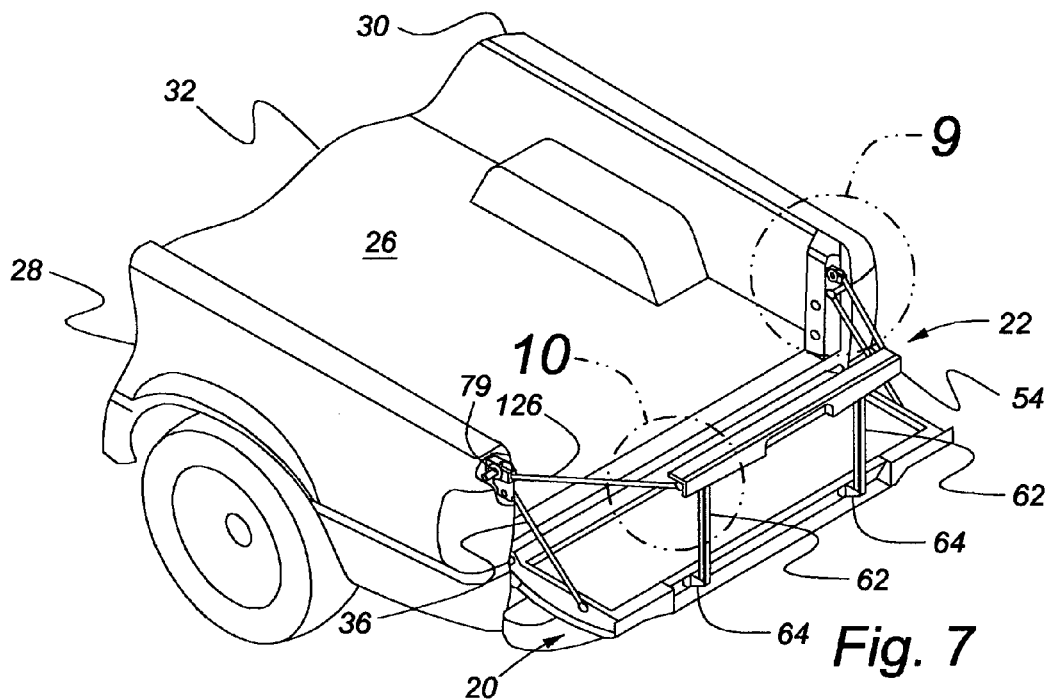
FIG. 7 is a partial perspective view similar to FIG. 5, but with the supplemental tailgate shown in a fully extended, upwardly rotated position, and with the vehicle tailgate in its open, generally horizontal position.
Figure 8:
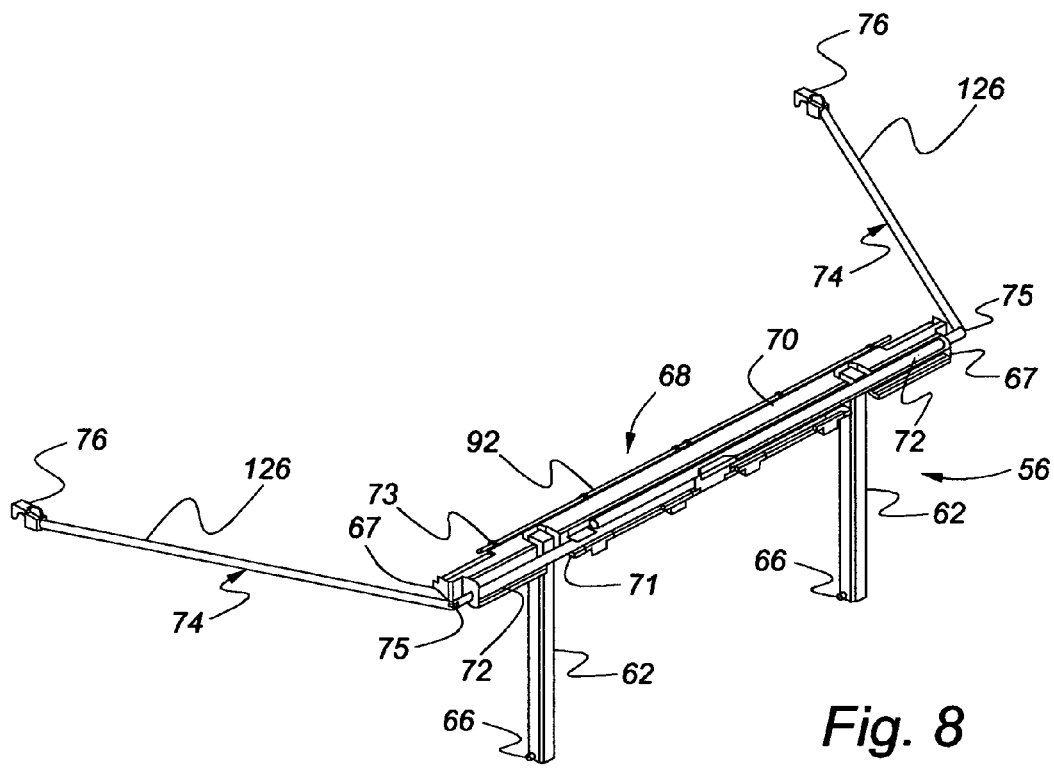
FIG. 8 is a rear perspective view of a movable frame portion of the supplemental tailgate, but without the pivotable molding illustrated, in accordance with the present invention.
Figure 9:
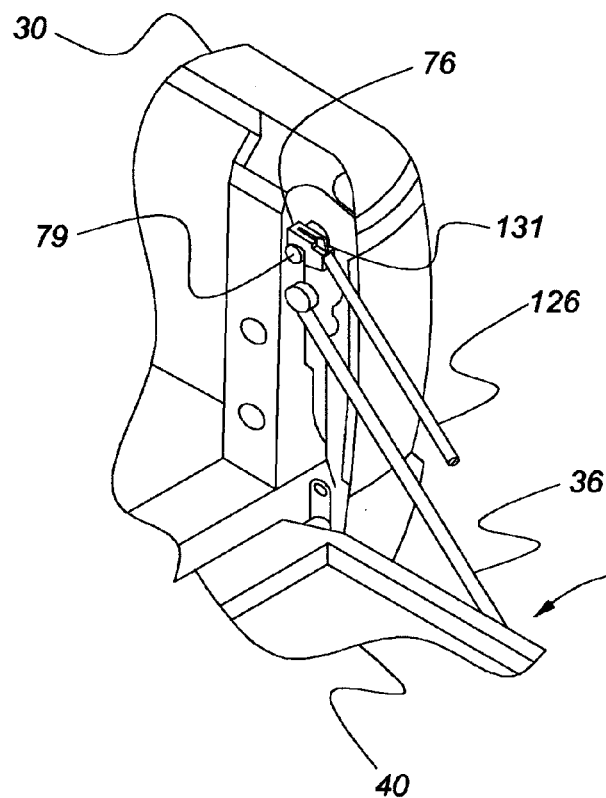
FIG. 9 is a perspective view, on an enlarged scale, illustrating encircled area 9 in FIG. 7.
Figure 10:
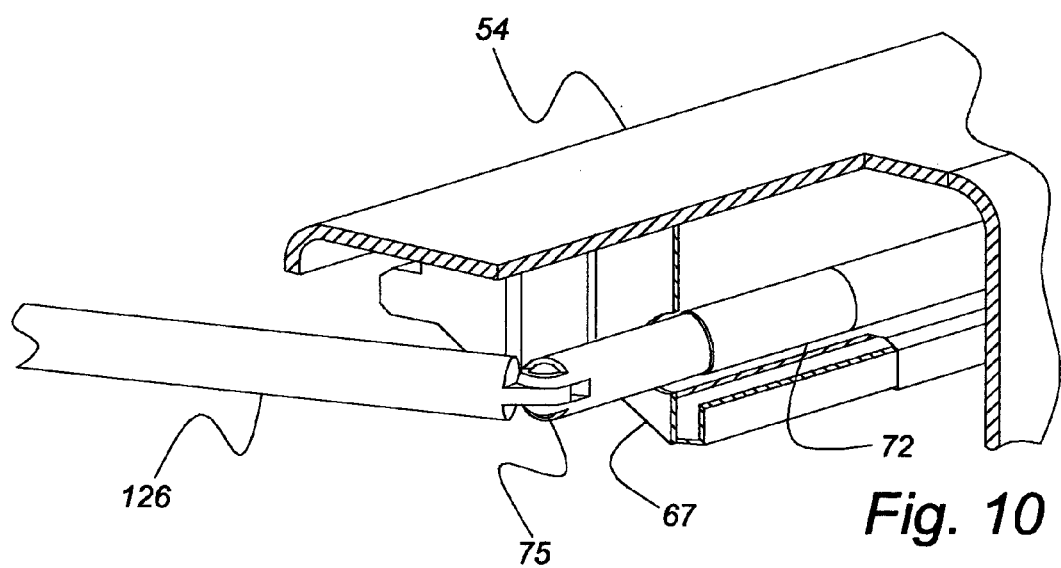
FIG. 10 is a perspective, partially cutaway view, on an enlarged scale, illustrating encircled area 10 in FIG. 7.
Figure 11:
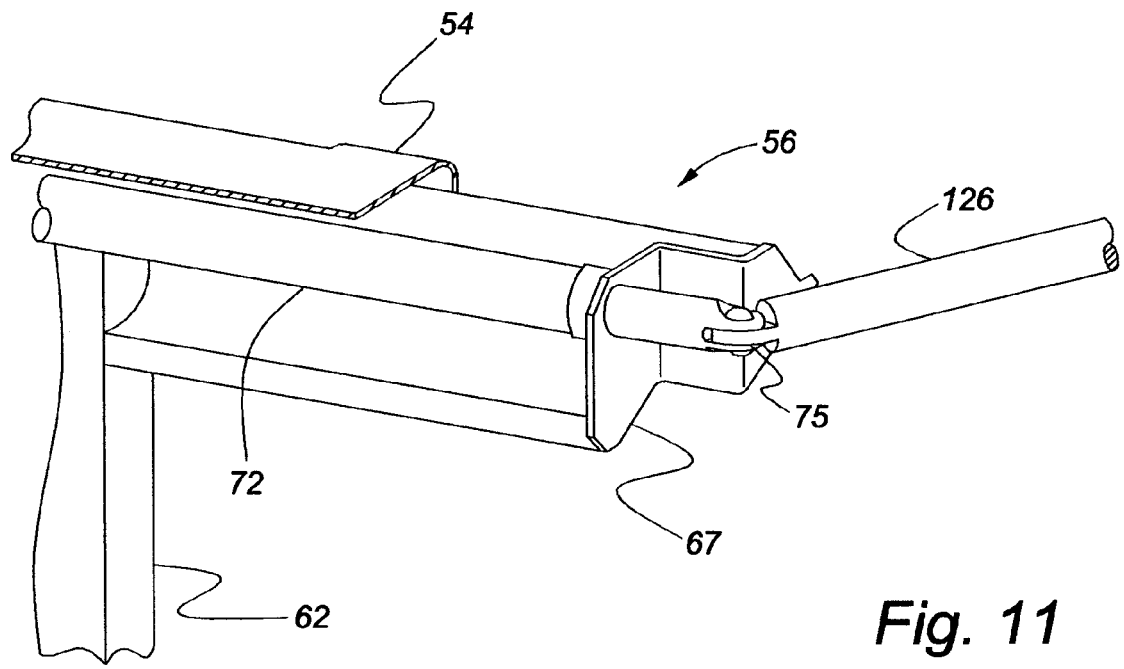
FIG. 11 is a perspective, partially cutaway view of the movable frame portion of the supplemental tailgate in accordance with the present invention.
Figure 12:
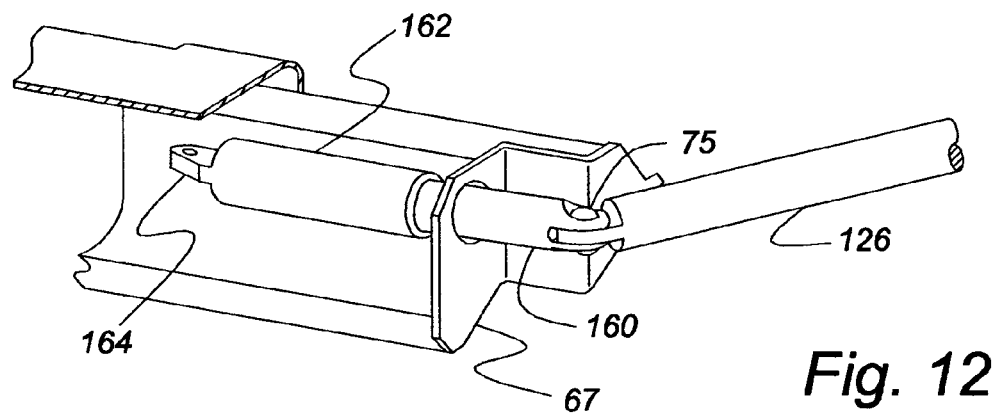
FIG. 12 is a view, on an enlarged scale, similar to FIG. 11, but without the hollow tube illustrated.
Figure 13A:
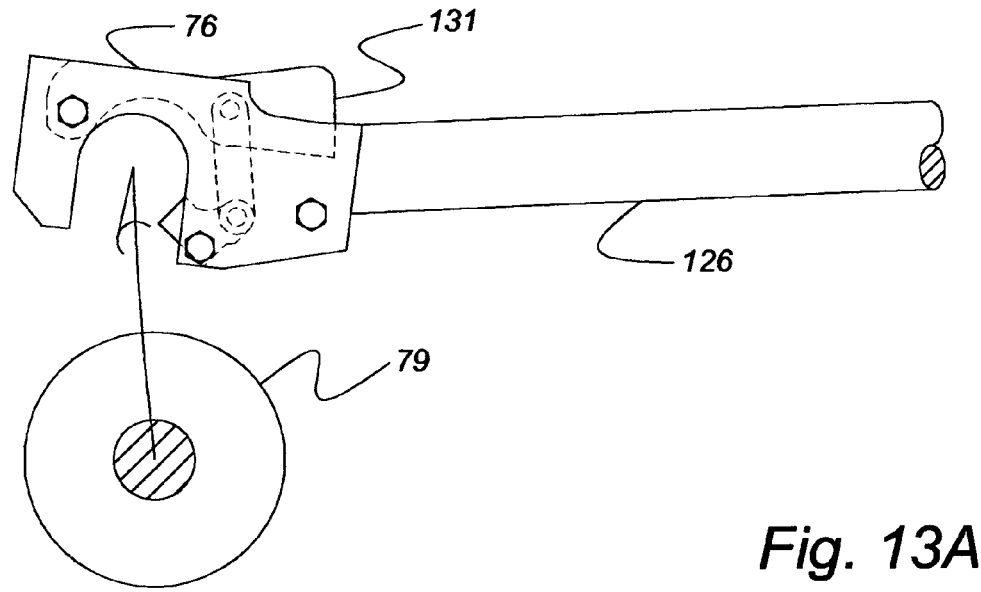
FIG. 13A is a side, partially sectional view of a lock rod latch prior to engagement with a hook support, in accordance with the present invention.
Figure 13B:
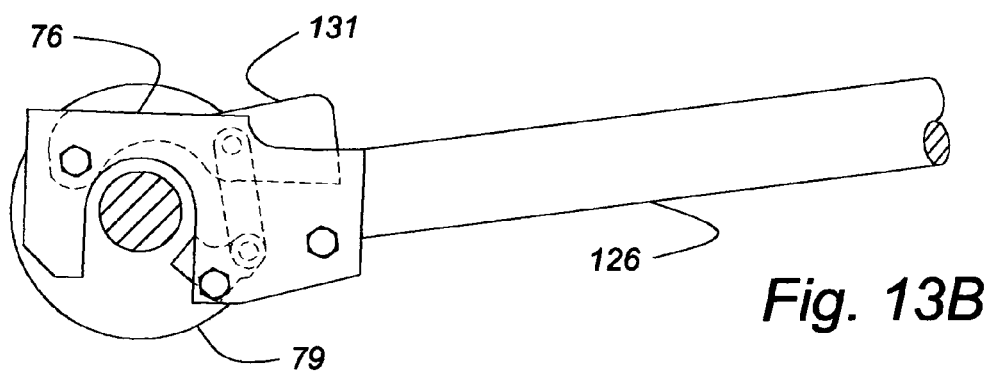
FIG. 13B is a view similar to FIG. 13A, but with the lock rod latch in a locked position on the hook support.
Figure 13C:
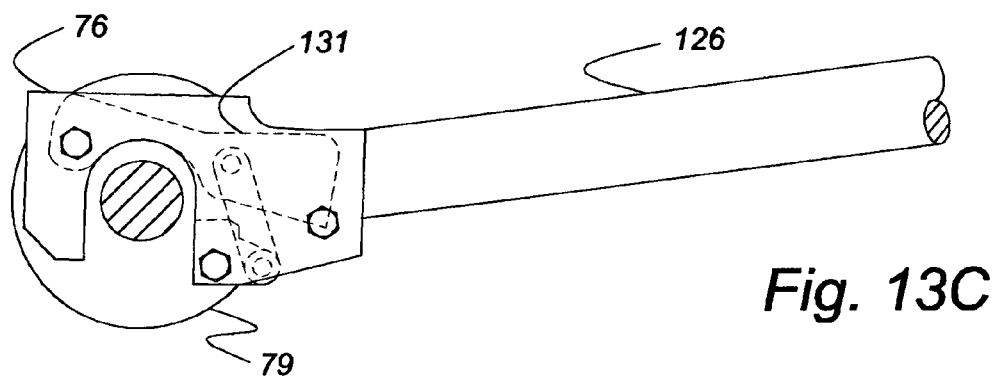
FIG. 13C is a view similar to FIG. 13A, but with the lock rod latch in an unlocked position on the hook support.
Figure 14:
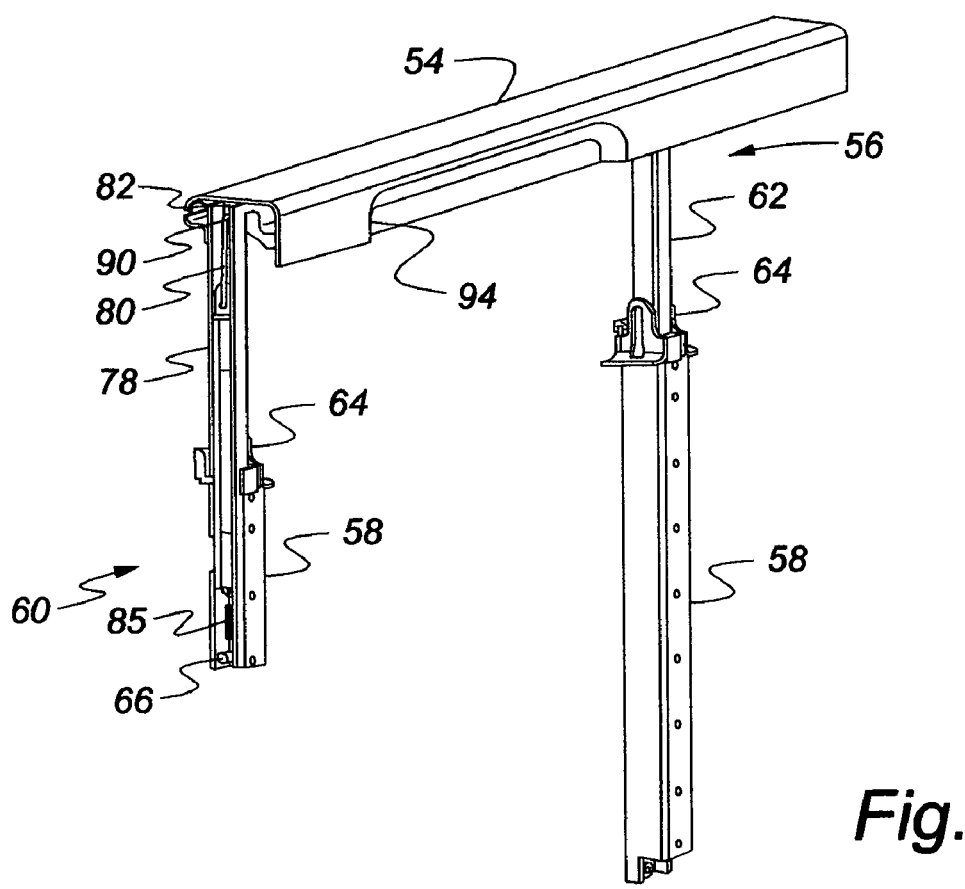
FIG. 14 illustrates a rear perspective, partially sectioned view similar to that of FIG. 4, but with the section cut taken at a different location.
Figure 15:
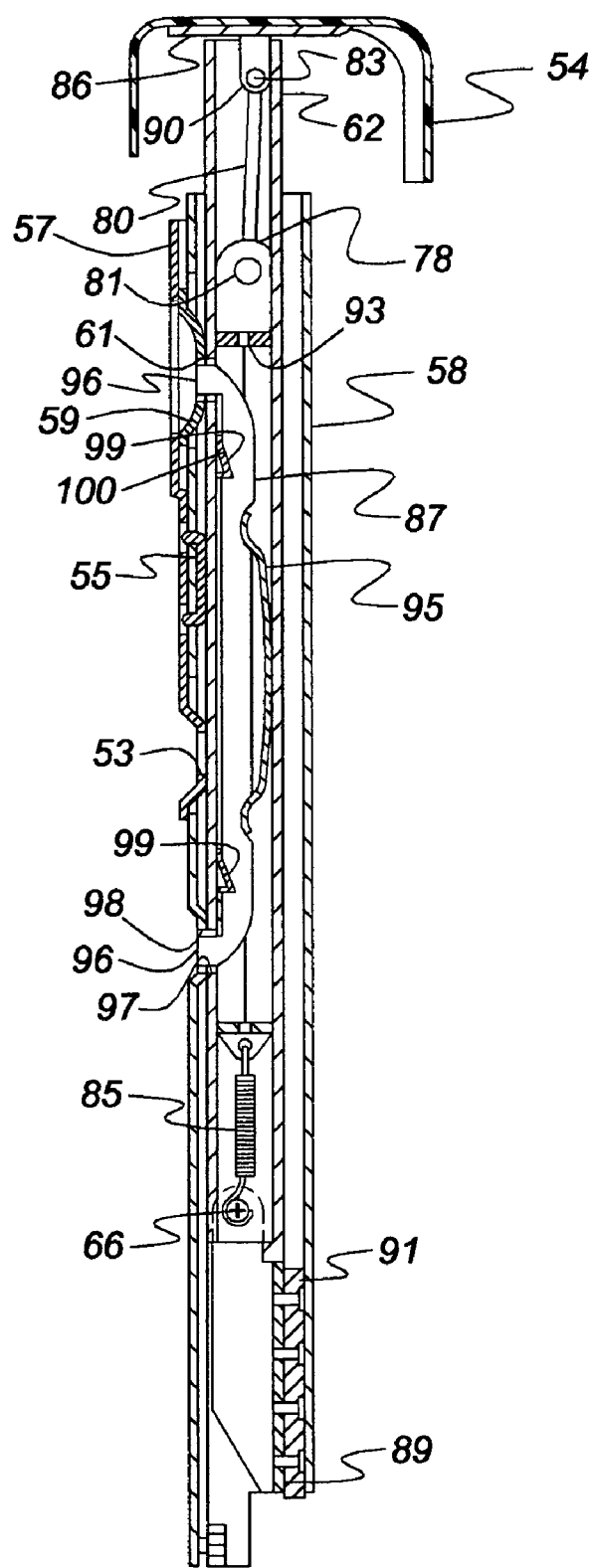
FIG. 15 is a side sectional view of the supplemental tailgate in accordance with the present invention.

FIGS. 1–15 illustrate a first embodiment of the present invention with a tailgate 20 that mounts to a vehicle 24—preferably a pickup truck. The tailgate 20 includes a supplemental tailgate 22 mounted therein. The vehicle 24 includes a box 26 that is defined by a left rear quarter panel 28, which forms a first vertical surface of the box 26; a right rear quarter panel 30, which forms a second vertical surface of the box 28; a bed 32, which extends between the two panels 28, 30 to form a cargo floor; and the tailgate 20, which is pivotable between a generally vertical closed position and a generally horizontal open position.

The tailgate 20 may include a pair of conventional tailgate hinges 34 that cooperate with the side panels 28, 30 to allow for pivoting of the tailgate 20, and a pair of tailgate supports 36, which support the tailgate 20 when in its open, horizontal position. A tailgate handle 35 mounts to an outer panel 38 and latches 120 mount to side portions of an inner panel 40 of the tailgate 20. The latches 120 can be selectively engaged with supports (which may be conventional latch pins) 79 mounted on the side panels 28, 30, and may be disengaged by actuation of the handle 35. Since the handle and latches 120 function in a conventional manner, their operation will not be discussed further herein.

The tailgate 20 is comprised of a tailgate frame 37 including the outer panel 38, which forms the outer finished surface of the tailgate 20, and the tailgate frame inner panel 40, which mounts to the outer panel 38 and forms the inner surface and sides 42 of the tailgate 20. The outer panel 38 and inner panel 40 combine to form a pair of upper surfaces with a gap 43 therebetween. Tailgate reinforcements (not shown) may mount within and provide structural support to the frame outer and inner panels 38, 40. A left tailgate molding 50 and a right tailgate molding 52 may mount on top of the upper surfaces of the tailgate frame 37. They may be made of colored plastic (or other suitable material) that is the desired color for these parts; this eliminates the need to paint them. In this way, the tailgate moldings 50, 52 will help provide an attractive appearance while preventing paint scratches on metal parts when cargo is being loaded over the top of a closed tailgate 20.

The components that make up the tailgate frame 37 are formed so that a generally hollow internal cavity is created. Within this cavity, the supplemental tailgate 22 is retained. The supplemental tailgate 22 includes a pivotable molding 54, a movable frame portion 56, and guide rails 58. The guide rails 58 are hollow, generally rectangular tubes that are fixed to the tailgate frame 37 and support the movable frame portion 56 as it is telescopically extended from and retracted into the guide rails 58.

Each guide rail 58 includes pivot brackets 64 mounted on top of each guide rail 58 that cooperate with the movable frame portion 56 to allow for both pivoting of the moveable frame portion 56 relative to the tailgate 20 and preventing the movable frame portion 56 from being separated from the guide rails 58. The pivot brackets 64 may be fastened to the tailgate frame 37 and the bottoms of the guide rails 58 may be fastened to the inner panel 40 in order to help secure the guide rails 58 to the tailgate 20.

The movable frame portion 56 includes a pair of support tubes 62 that are each received telescopically in a respective one of the guide rails 58. Each of the guide rails 58 may include a block spacer 55 mounted therein against which the support tubes 62 can slide. The block spacers 55 may be formed of plastic to minimize potential scratching of the support tubes 62 as they slide relative to the guide rails 58. Each of the support tubes 62 includes a hinge pin 66 that cooperates with slots 65 in the pivot brackets 64, when fully extended, in order to allow for pivoting of the movable frame portion 56 relative to the guide rails 58 while still allowing the guide rails 58 to retain and support the support tubes 62. The hinge pins 66 may be secured to the support tubes by welding, interference fit, or any other suitable means.

Each of the support tubes 62 also connects to a corresponding one of the latching assemblies 60. The latching assemblies 60 releasably fix the support tubes 62 to a certain limited number of telescopically extended positions relative to the guide rails 58. When extended out partially, the guide rails 58 will hold the support tubes 62 parallel to it, thus creating a longer effective bed for the truck when the tailgate 20 is in its horizontal position. Each of the movable frame portion's support tubes 62 may be hollow so they can receive a respective one of the two latching assemblies 60 therein.

More specifically, latch housings 78 extend through each of the support tubes 62 and connect, at their upper ends, to the lower ends of latch actuation rods 80 via retainer barrels 81. The upper ends of the latch actuation rods 80 are secured, via retaining clips 83, to release levers 82, which are part of the pivotable molding 54, in order to form a release hinge 84. The lower ends of the latch housings 78 connect to latch return springs 85, which, in turn, are connected to the hinge pins 66. Also connected to the hinge pins 66 are linear guides 89. The linear guides 89 may include sliders 91, which provide for surface contact with the inside of the guide rails 58. Alternatively, the linear guides and sliders may be replaced with roller guides and rollers (not shown) in order to provide a more smooth feeling motion when extending and retracting the support tubes 62 relative to the guide rails.

Each of the latch housings 78 also includes a longitudinally extending slot 93, within which is mounted a respective one of two latch blades 87. Each latch blade 87 is biased into its corresponding slot 93 by a latch blade spring 95. The springs 95 cause retention tabs 96, protruding from the latch blades 87, to extend through corresponding holes 97 in the support tubes 62. Also, when aligned, the retention tabs 96 are biased by the springs 95 to extend through engagement slots 98 in the guide rails 58 and through engagement slots 61 in insert plates 59. The insert plates 59 may be secured to their respective guide rails 58 by detent covers 57. The engagement slots 61, 98 may be longer than the width of the corresponding retention tabs 96 and the insert plates 59 adjustable relative to their corresponding detent covers 57 in order to allow for small adjustments in the position of the support tubes 62 relative to the guide rails 58. This small adjustability may allow one to make sure that the top of the pivotable molding 54 is flush with the tops of the tailgate moldings 50, 52 when the supplemental tailgate 22 is in its stowed position. Each latch housing 78 also includes internal flanges 99, located within the slot 93, that engage with release ramps 100 on the latch blade 87.

Even though, for some features of the supplemental tailgate 22, only the features on the left or right side is shown, the supplemental tailgate 22 is generally symmetrical right to left, so the opposite side is just the mirror image of the feature shown on that first side. Accordingly, for the description herein, if the feature is shown on only a first side, the feature on the second, opposite side is presumed to be the mirror image of the feature shown on the first side.

The movable frame portion 56 also includes a cross member assembly 68 that connects to the tops of the support tubes 62. The cross member assembly 68 includes a pair of post brackets 71 and lock rod brackets 67 that form a support frame 70. The cross member assembly 68 may also include a pair of hollow tubes 72 and six pivot mounts 73 mounted on the support frame 70.

The support frame 70 may be formed strong enough to support the weight of one or more people standing on it. This way, if the movable frame portion 56 is extended out and pivoted downward toward the ground, the support frame 70 can be used as a step.

The hollow tubes 72 each telescopically receive a respective one of two lock rod assemblies 74, which each have pivot hinges 75 at one end of a rod 126 and lock rod latches 76 at the far ends. The pivot hinges 75 connect each lock rod 126 to a respective sliding member 160, which are supported by the lock rod brackets 67 when the lock rod assemblies 74 are fully extended. The sliding members 160 also each connect to base portions 162, which prevent the lock rod assemblies 74 from being completely pulled out of the hollow tubes 72. Optionally, each base portion 162 may connect to a tip portion 164, which connects to a retraction spring (not shown), for assisting in retracting the lock rod assemblies 74 into the hollow tubes 72 when preparing to stow the supplemental tailgate 22.

At the other end of the lock rods 126, the lock rod latches 76 may be formed from a single cast piece, formed from two stamped halves that are secured together, or formed by some other suitable means. The material from which they are formed may be stainless steel, some other suitable corrosion resistant material, or some other suitable material with a corrosion resistant coating thereon. The lock rod latches 76 may be secured to the hollow tubes 72 by welding, fasteners, or some other suitable means.

The lock rod latches 76 are selectively connectable to the hook supports 79. Each lock rod latch 76 includes a release lever assembly 131 mounted thereto that, when actuated, allows the lock rod latch 76 to slide onto its hook support 79, and, when released, secures that lock rod latch 76 on the hook support 79.

The pivot hinges 75 allow the lock rod assemblies 74 to be extended toward the truck so that the lock rod latches 76 can hook to supports 79 on the truck box 26 in order to allow the movable frame portion 56 to be held in its upright position, thus creating a box extender. The supports 79 are preferably just the conventional pin strikers used to hold the tailgate in its closed position. This way, the same supports can be employed on the vehicle, whether using a conventional tailgate or the tailgate 20 of this invention.

The pivot mounts 73 connect to and mount the pivotable molding 54 about a pivot axis 77. The pivotable molding 54 may be formed from plastic, or other suitable material such as, for example, a thirty percent glass filled polypropylene. The release levers 82 may be molded into the pivotable molding 54 as it is being formed or affixed thereto after forming by, for example, friction welding. Each release lever 82 includes a pivot flange 88 and a spaced release flange 90 extending therefrom. Each pivot flange 88 pivotally mounts about one of the pivot mounts 73. The pivot flange 88, then, will allow the pivotable molding 54 to pivot about the pivot axis 77. Each release flange 90 is offset from the pivot axis 77 and is connected to one of the latch actuation rods 80. Thus, when the pivotable molding 54 is pivoted, the release flanges 90 will pull up on the latch actuation rods 80. The latch actuation rods 80, in turn, pull up on the latch housings 78, which cause the latching assemblies 60 unlatch. This allows the support tubes 62 to slide relative to the guide rails 58 when the latch actuation rods 80 are pulled upwards and re-engage when the latch actuation rods 80 are released.

The pivotable molding 54 may be molded with the plastic being the desired final color so that it does not have to be painted. The pivotable molding 54 also may include a handle pocket 94 that is molded into the rear surface of the pivotable molding 54. The handle pocket 94 provides for ease of gripping and pivoting the pivotable molding 54 when deploying the supplemental tailgate 22. The pivotable molding 54 may have an overall width that is just smaller than the gap 43 formed between the two tailgate moldings 50, 52, and has a top surface that is flush with the top surfaces of the two tailgate moldings 50, 52. In this way, the supplemental tailgate 22, when in its fully retracted position, will blend-in with the tailgate 20, having an appearance that is very similar to a tailgate that does not include a supplemental tailgate. Alternatively, the two tailgate moldings 50, 52 may each include tabs (only shown in the second embodiment below) that are recessed under the edges of the pivotable molding 54, which will rest on top, with the tabs recessed sufficiently to allow the top surfaces to be flush with each other. Thus, the supplemental tailgate 22 can be included without detracting from the esthetically pleasing look of the vehicle, and, moreover, the pivotable molding 54 will still allow for cargo to be slid into and out of the box 26 over the top of a closed tailgate 20 without creating paint scratch concerns.

The operation of the supplemental tailgate 22 will now be described. The supplemental tailgate 22 may be easily released from its stowed position within the tailgate 20 while the tailgate 20 is in its open or closed position. Although, for the most advantageous use of the supplemental tailgate functions, the tailgate 20 will be in its horizontal open position. Optionally, if so desired, an extra latching mechanism (not shown) may be employed that will only allow release of the supplemental tailgate 22 when the tailgate 20 is in its horizontal position.

To deploy the supplemental tailgate 22 from its stowed position, one grasps the pivotable molding 54 and pivots it relative to the pivot axis 77. This will cause the release flanges 90 to pull up on the latch actuation rods 80, which, in turn, will pull up on the latch housings 78 against the bias of the latch return spring 85. As the latch housings 78 move upward, the internal flanges 99 slide along the release ramps 100, which causes the latch blades 87 to begin sliding against the bias of the latch blade springs 95. As the latch blades 87 slide outward, the retention tabs 96 slide out of the engagement slots 61, 98, thus releasing the movable frame portion 56 and allowing it to slide relative to the guide rails 58. Springs (not shown) may be provided to bias the movable frame portion 56 away from the tailgate frame 37 when the latching assemblies 60 are released, but are not necessary for operation of this invention.

One then pulls on the supplemental tailgate 22 to telescopically slide the support tubes 62 relative to the guide rails 58, while allowing the pivotable molding 54 to pivot back into its latch engaged position. Once the movable frame portion 56 is slid out to a predetermined extended position relative to the tailgate 20, the retention tabs 96 on the lower end of the latch blades 87 will engage an engagement slot 53 or engagement slot 61 (depending upon how far the support tubes 62 are slid prior to releasing the pivotable molding 54), thus fixing the movable frame portion 56 relative to the guide rails 58. Also, at these extended positions, the support tubes 62 still remain partially within the guide rails 58 so that the two will not pivot relative to one another. With the tailgate 20 in its horizontal open position, the supplemental tailgate 22 is now in its bed extender position, (see FIG. 6). While only a limited number of bed extender positions are discussed herein, the supplemental tailgate 22 may have additional bed extender positions by providing additional engagement slots, if so desired.

The pivotable molding 54 may then be pivoted again to release the latching assemblies 60 once more. One may then pull the supplemental tailgate 22 out to its fully extended position relative to the open tailgate 20. In this fully extended position, the support tubes 62 will be pulled out of the guide rails 58, with the hinge pins 66 engaged in the slots 65 of the pivot brackets 64.

The movable frame portion 56, from its fully extended position, can be pivoted upward into an upward extending vertical position, to serve as a box extender. The lock rod assemblies 74 are pulled out of their respective hollow tubes 72 until each pivot hinge 75 is exposed, with the base portions 162 preventing the rods 126 from being pulled completely out. Each lock rod 126 is then rotated toward the back end of the vehicle 24 until the lock rod latches 76 are located just above the hook supports 79, (best seen in FIG. 13A). For each side, the operator then pushes in on the release lever assembly 131 and lowers the lock rod latch 76 onto the hook support 79, (best seen in FIG. 13C). The operator releases the release lever assembly 131, thus securing the lock rod 126 in place, (best seen in FIGS. 9 and 13B). The supplemental tailgate 22 is now secured in its upright, box extender position. The support tubes 62 and cross member assembly 68 will support cargo with aft applied loads, and the lock rod assemblies 74 will support cargo with side applied loads.

Performing the deployment operation generally in reverse will allow one to easily stow and latch the supplemental tailgate 22 back into the tailgate 20. Hence, an easy to operate and ergonomic supplemental tailgate 22 is provided for the vehicle 24. Moreover, while generally no modifications to the vehicle itself may be required, in which case a standard vehicle can accept either a conventional tailgate or the tailgate 20 with the supplemental tailgate 22, one may, if so desired, increase the strength of the structure toward the rear of the box 26 in order to better support the tailgate 20 of the present invention.

Figure 20:
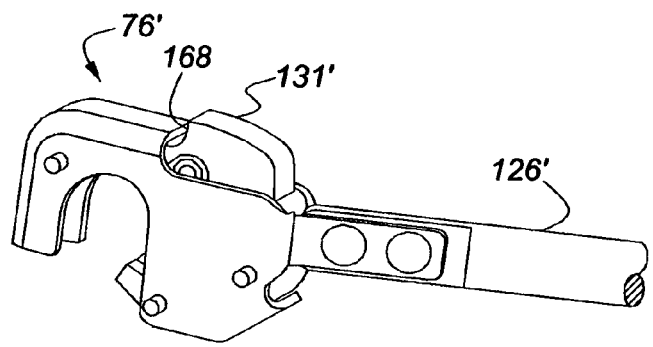
FIG. 20 is a partial, perspective view of a lock rod latch according to the second embodiment of the present invention.
Figure 21:
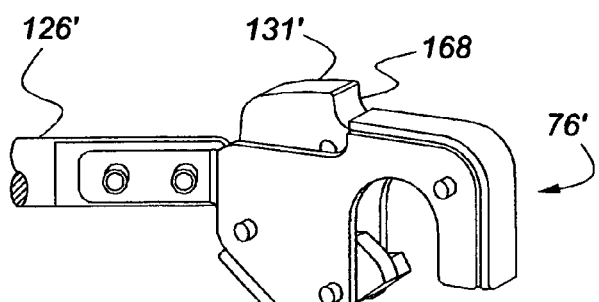
FIG. 21 is a view similar to FIG. 20, but viewing the lock rod latch from its opposite side.
Figure 22:
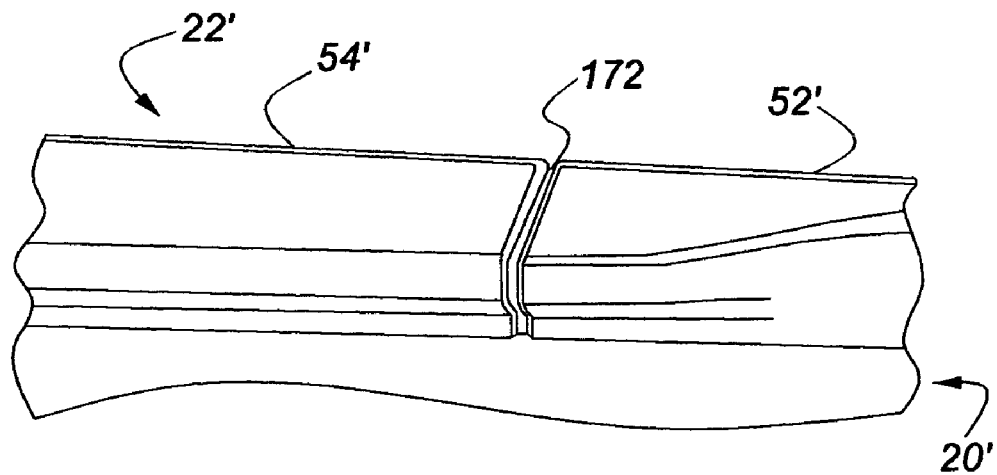
FIG. 22 is a perspective view of a portion of the tailgate according to the second embodiment of the present invention.
Figure 23:
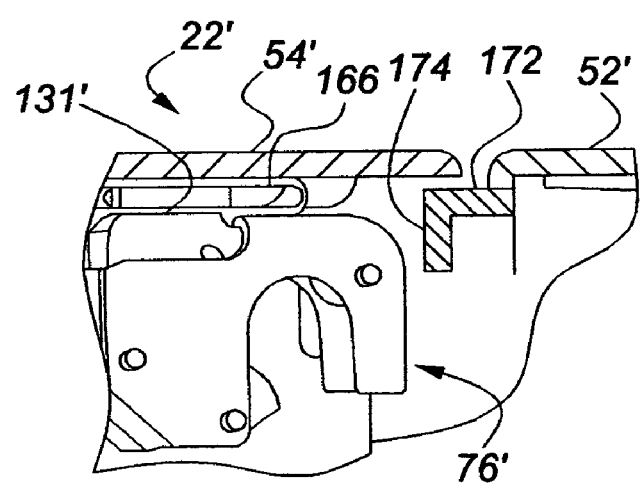
FIG. 23 is a partial cutaway front view of the portion of the tailgate illustrated in FIG. 22.
Figure 26:
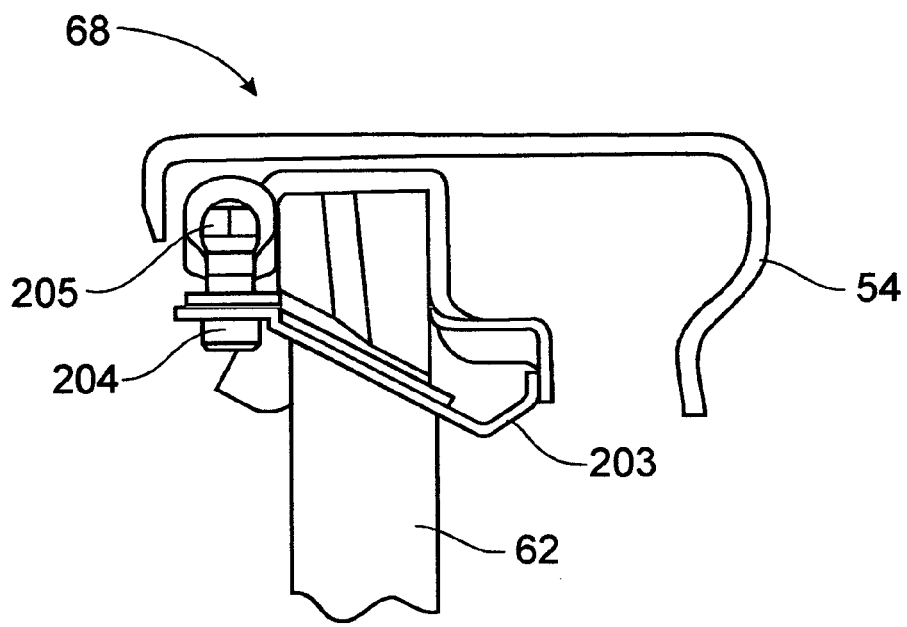
FIG. 26 is a partial side elevational view of the supplemental tailgate structure depicted in FIG. 24.
Figure 27:
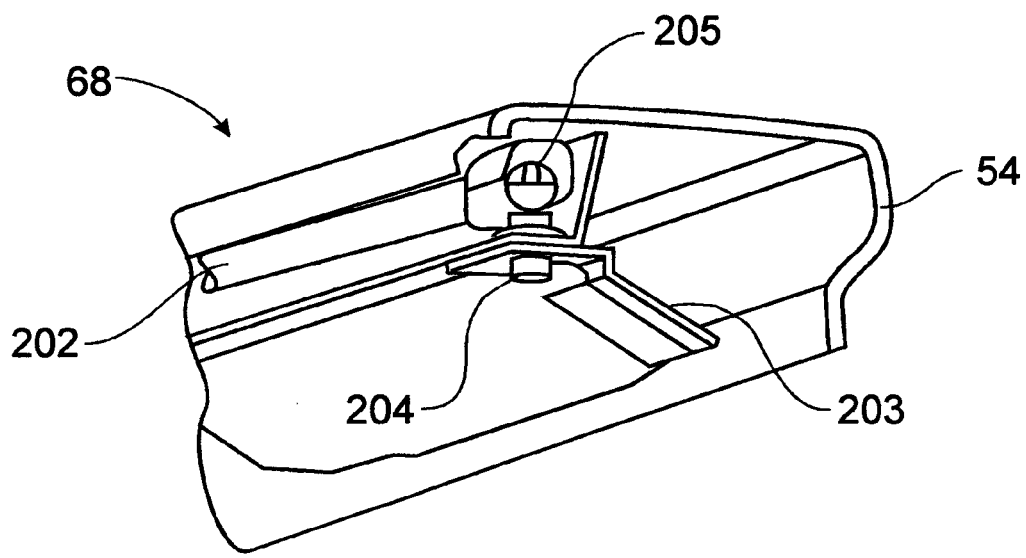
FIG. 27 is a partial perspective view of the end of the supplemental tailgate structure depicted in FIG. 24.

FIGS. 16–23 illustrate a second embodiment of the present invention. In this embodiment, the mounting of the pivoting ends of the lock rods have been modified, as best seen in FIGS. 16–19, the lock rod latches have been modified, as best seen in FIGS. 20 and 21, and the interaction of the lock rods, when stowed, with the tailgate moldings has been modified, as best seen in FIGS. 22 and 23.

Figure 16:
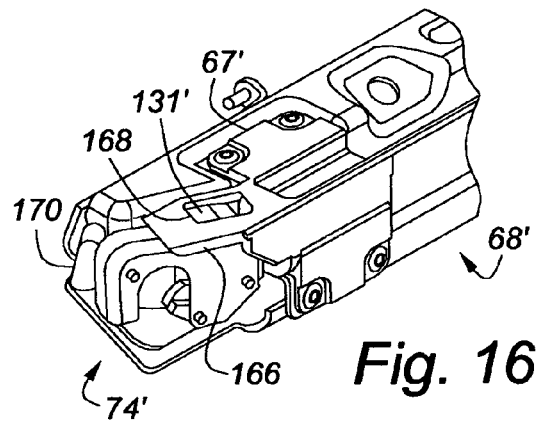
FIG. 16 is a perspective view of a portion of the supplemental tailgate, with a lock rod assembly in its stowed position and without the pivotable molding shown, in accordance with a second embodiment of the present invention.
Figure 17:
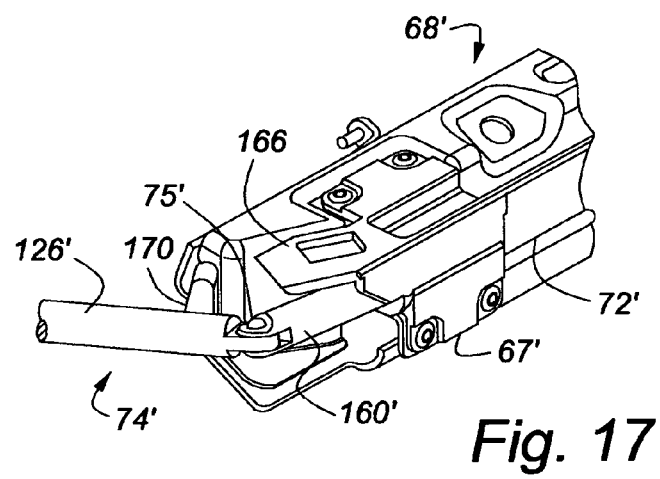
FIG. 17 is a perspective view similar to FIG. 16 but illustrating the lock rod assembly in its extended position.
Figure 18:
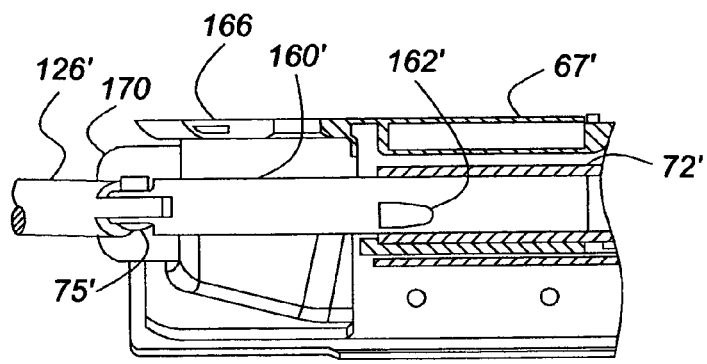
FIG. 18 is partially cutaway, front view of a portion of the supplemental tailgate in accordance with the second embodiment of the present invention.
Figure 19:
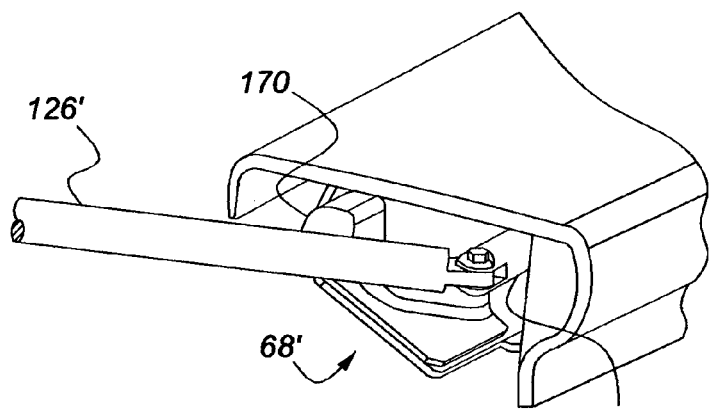
FIG. 19 is perspective view similar to FIG. 17 but also including the pivotable molding.

Referring to FIGS. 16–21, the cross member assembly 68' employs more substantial lock rod brackets 67' that may provide improved support of the lock rod assemblies 74' when they are in their extended positions. The lock rod brackets 67' may include lock rod release levers 166, which engage with corresponding lock rod catches 168 on the release levers 131 in order to hold the lock rod assemblies 74 in their fully stowed positions (as seen in FIG. 16). With these catches 168, the lock rod assemblies 74' are positively retained in order to ensure that they remain fully stowed—thus avoiding any interference concerns—when retracting the supplemental tailgate into its stowed position. Also, these catches 168 may minimize the potential for the lock rod assemblies 74' to slide out of their fully stowed positions during vehicle cornering.

During deployment, the lock rod catches 168 may be depressed to release them from the lock rod release levers 166, allowing the lock rod assemblies 74' to be pulled from their respective hollow tubes 72'. The lock rods 126' and sliding members 160' are pulled from the hollow tubes 72' until stop tabs 162' (only seen in FIG. 18), extending from the sliding members 160', engage with the lock rod brackets 67'. The stop tabs 162' prevent the lock rod assemblies 74' from being pulled completely out of the cross member assembly 68'. As the lock rods 126' are pivoted about their respective pivot hinges 75' toward their deployed positions, the lock rods 126' may press against lock rod bumpers 170, which may be formed from an elastomeric material. The bumpers 170 may assist in minimizing side-to-side chucking that may occur when the vehicle box undergoes twisting loads during vehicle operation.

Referring to FIGS. 20 and 21, the lock rod latches 76' may be formed from two main housing parts, which may be formed by stamping, attached together after assembly of the release lever 131' therein. Also, the lock rod latches 76' may be riveted or fastened to the lock rods 126' rather than being attached by welding.

Referring to FIGS. 22 and 23, the pivotable molding 54' still mounts between the tailgate moldings 50, 52 (only the right tailgate molding shown), but each of the tailgate moldings 50, 52 may include a side molding flange 172 that nests underneath the corresponding edge of the pivotable molding 54'. A lock rod stowage tab 174 may extend from each side molding flange 172 enough that, when the supplemental tailgate 22' is in its stowed position, the corresponding lock rod latch 76' will abut the lock rod stowage tab 174 should the release lever 131' come loose from its lock rod release lever 166. The lock rod stowage tabs 174, then, may prevent the lock rod latches 76' from moving while the supplemental tailgate 22' is stowed and interfering with the ability to open the supplemental tailgate 22'.

Referring now to FIGS. 24–28, an alternative lock rod apparatus 200 can best be seen. This alternative lock rod apparatus 200 is in the form of a pair of opposing fixed length lock rod members 202 that are pivotally mounted on a support bracket 203 welded into the cross member assembly 68. The support bracket 203 retains a pivot shaft 204 onto which is mounted a ball joint 205 that permits limited vertical movement of each lock rod member 202 in addition to being pivotally movable about the pivot shaft 204. Preferably, each lock rod member 202 is also provided with a ball joint 206 at the distal end 207 of the lock rod member 202 to facilitate attachment of the lock rod member 202 to the corresponding support 79 or to a latching member (not shown) specifically adapted for utilization with the distal ball joints 206.

The lock rod members 202 are positionable within the cross member assembly 68 in a stored position, as is shown in FIG. 24 to be stowed beneath the pivotable molding 54 along the forward edge thereof thus allowing the molding 54 to be pivoted for actuation of the supplemental tailgate 22 as is described in detail above. The lock rod members 202 are formed with a bend 209 near the distal end 207 thereof to facilitate positioning thereof in the stored position shown in FIG. 24. Since the respective pivot shafts 204 are on substantially the same generally horizontal plane and further since the fixed length of the lock rod members 202 is greater than half the overall length of the cross member assembly 68, the bend 209 permits the two lock rod members 202 to be nested beneath the pivotable molding 54 with the respective distal ends 207 overlapping at the central portion of the cross member assembly 68. The bend 209 requires that the two opposing lock rod members 202 to be mounted oppositely such that the distal end 207 of one lock rod member is bent downwardly, while the distal end 207 of the opposing lock rod member 202 is bent upwardly.

Figure 28:
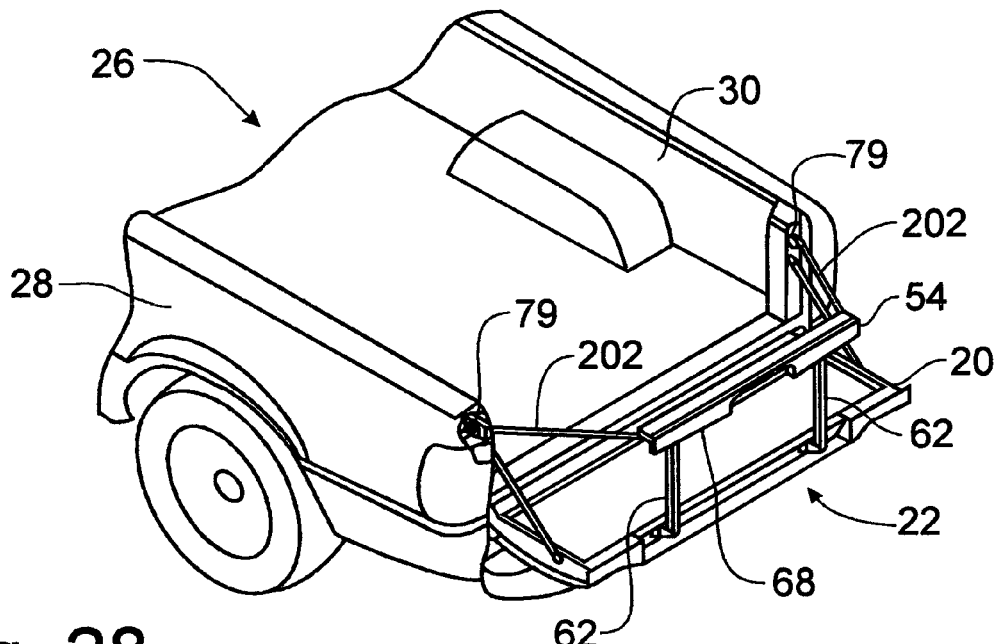
FIG. 28 is a perspective view of the rearward portion of a pickup truck, similar to that of FIG. 7 but deploying the pivoted lock rod apparatus depicted in FIG. 24 into an operative position.

Deployment of the lock rod apparatus 200 can be affected simply by grasping the distal end 207 of one of the lock rod members 202 from the forward side of the cross member assembly 68 and deflecting the lock rod member 202 as needed through movement at the ball joint 205 to release the lock rod member 202 from beneath the pivotable molding 54. The lock rod member 202 is then pivoted about the pivot shaft 204 until the distal ball joint 206 is aligned with the support 79 or other appropriate latch member (not shown). The distal ball joint 206 is then utilized to affix the lock rod member 202 to the body 28, 30. When the opposing lock rod member 202 is similarly affixed to the body 28, 30 of the vehicle 24, the supplemental tailgate 22 is stably positioned in an upright orientation generally perpendicular to the opened tailgate 20, thus extending the effective size of the box 26, as is best seen in FIG. 28.

Figure 31:
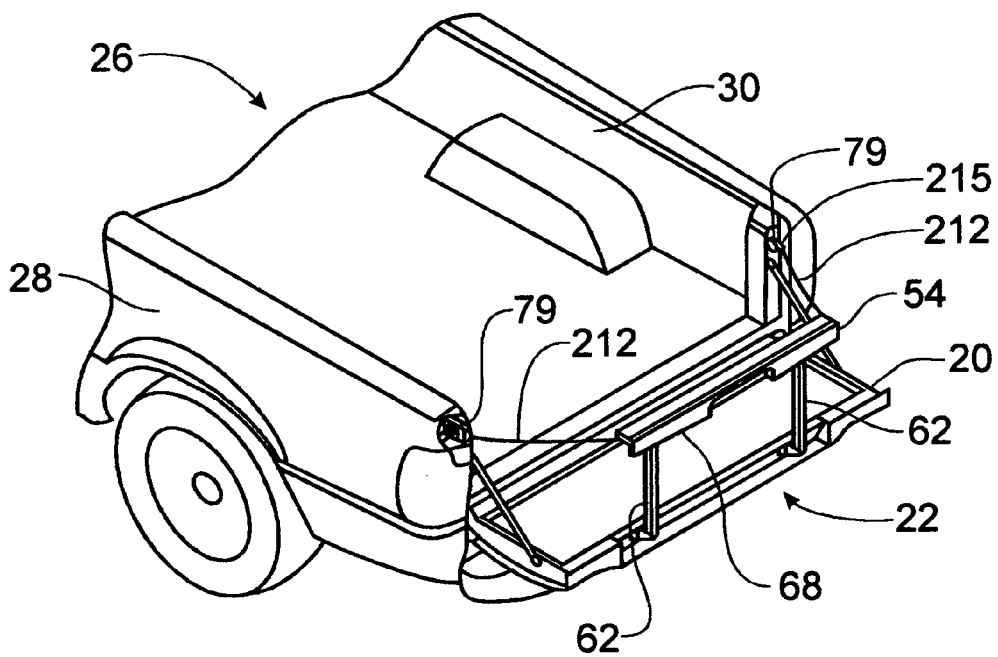
FIG. 31 is a perspective view of the rearward portion of a pickup truck, similar to that of FIG. 28 but deploying the flexible cable embodiment of the lock rod apparatus depicted in FIG. 30 into an operative position.
Figure 29:
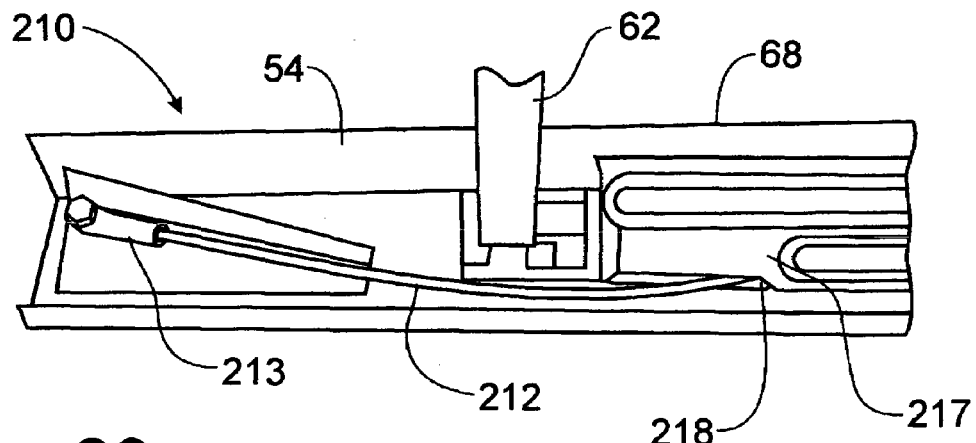
FIG. 29 is a partial bottom perspective view of the supplemental tailgate structure having another alternative embodiment of a lock rod apparatus in the form of a flexible cable pivotally mounted to the cross member, the flexible cable being shown in the stowed position.
Figure 30:
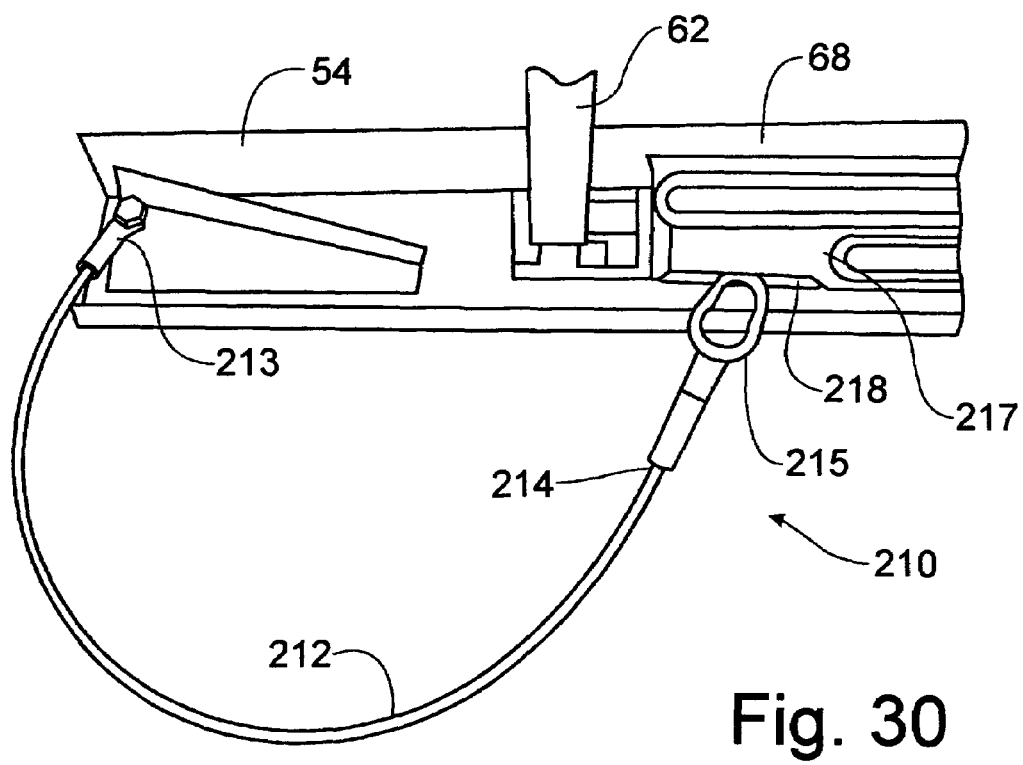
FIG. 30 is a partial bottom perspective view similar to that of FIG. 29, but showing the flexible cable being moved from the stowed position toward an operative position.

Referring now to FIGS. 29–31, a low cost version of the lock rod apparatus 210 can best be seen. Instead of fixed length, rigid, tubular lock rod members 202, as depicted in FIGS. 24–28, the lock rod members 212 are formed from a pair of flexible cables. Each flexible cable 212 has one end pivotally connected to the cross member assembly 68 through a pivot member 213 affixed to the flexible cable 212 and mounted at the respective end of the cross member assembly 68. The distal end 214 of the flexible cable member 212 is equipped with a connector member 215 affixed thereto for engagement with the support 79. A conventional spring flange restrictor (not shown) can be added to the connector member 215 to restrict movement of the connector member 215 off the support pin 79.

The flexible cable lock member 212 can be stored within the cross member assembly 68 simply by forming a slotted housing 217 having a suitably sized access slot 218 to permit the passage of the connector member 215 and the cable 212 into the housing 217. A fixture (not shown) can be provided to engage the connector member 215 to restrict unwanted movement thereof within the housing. The flexible cable lock member 212 can be moved from the stowed position depicted in FIG. 29 into the operative position depicted in FIG. 31 by disengaging the connector member 215 from any retaining fixture (not shown) and withdrawing the cable member 212 and the connector member 215 from the housing 217 through the access slot 218 until the connector member 215 is free from the housing 217, as is depicted in FIG. 30. The connector member 215 can then be moved into engagement with the corresponding support pin 79, with the cable member 212 pivoting about the pivot member 213. Once connected, the two flexible cable lock members 212 will be operable to prevent the supplemental tailgate 22 from moving rearwardly from the upright position depicted in FIG. 31 when encountering a load from objects placed within the box 26.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A tailgate assembly for use with a motor vehicle having a pair of spaced, generally vertical side walls and a generally horizontal bed extending therebetween, the tailgate assembly comprising:
    a tailgate frame, including a rear panel and a front panel, and adapted to pivotally mount generally between the side walls and being operable in a generally horizontal open position;
    a supplemental tailgate positioned between the rear panel and the front panel of said tailgate frame and including a movable frame assembly extendable from said tailgate frame between a retracted position and an extended position, said movable frame assembly being pivotable relative to said tailgate frame to permit said movable frame to be oriented generally perpendicularly to said tailgate frame so that said movable frame assembly can be positioned in a generally vertical orientation when said tailgate frame is in said open position; and
    a lock rod assembly pivotally connected to said movable frame and being positionable to interconnect said movable frame assembly and at least one of said side walls when said movable frame is in said generally vertical orientation.

2. The tailgate assembly of claim 1 wherein said movable frame assembly includes a generally horizontally disposed cross member mounted on at least one support tube operable to extend said cross member away from said tailgate frame.

3. The tailgate assembly of claim 2 wherein said lock rod assembly includes a pair of lock members supported at transversely spaced locations on said movable frame assembly and connectable, respectively, with corresponding latch members on said side walls.

4. The tailgate assembly of claim 3 wherein said lock members are telescopically extendable from and pivotable relative to transversely opposing ends of said cross member, each said lock member having a lock rod latch affixed thereto that is adapted to releasably latch to one of the pair of side walls to thereby support the movable frame portion relative to said tailgate frame.

5. The tailgate assembly of claim 4 wherein said movable frame assembly includes first and second hollow tubes supported by the cross member, each said lock member being telescopically mounted within and supported by a respective one of said first and second hollow tubes.

6. The tailgate assembly of claim 5 wherein said cross member includes a lock rod release lever that is selectively engagable with the lock rod latch to secure said lock members within the respective hollow tubes.

7. The tailgate assembly of claim 3 wherein said lock members are pivotally mounted on said movable frame assembly and swingable between a stored position supported within said movable frame assembly and an operative position extending from said movable frame assembly to the corresponding said side walls.

8. The tailgate assembly of claim 7 wherein each said lock member is a fixed length rigid rod member pivotally supported on a pivot shaft located at one of transversely opposed ends of said cross member.

9. The tailgate assembly of claim 8 wherein each said pivot shaft is supported on a bracket forming part of said movable frame assembly, each said lock member including a ball joint mounted on said pivot shaft to permit limited vertical movement of said lock member relative to said movable frame assembly.

10. The tailgate assembly of claim 9 wherein each said lock member is formed with a bend therein to facilitate storage thereof within said movable frame assembly.

11. The tailgate assembly of claim 9 wherein each said lock member further includes a second ball joint mounted on a distal end of each said lock member.

12. The tailgate assembly of claim 3 wherein each said lock member is formed from a flexible cable having a pivot end pivotally supported on a respective corresponding transverse end of said cross member.

13. The tailgate assembly of claim 12 wherein each said flexible cable lock member includes a distal end formed with a connector member, each said connector member and said flexible cable lock member being stowable within said movable frame assembly.

14. A supplemental tailgate assembly for use with a vehicle tailgate pivotally supported between generally vertically oriented vehicle side walls for movement between an upright closed position and a generally horizontally extending open position, said vehicle tailgate having a tailgate frame forming a generally hollow cavity therein, the supplemental tailgate assembly comprising:

a movable frame assembly having at least one extendible support on which is mounted a generally horizontally disposed cross member having a first end and a transversely opposed second end; and a lock rod assembly having first and second lock members mounted respectively on said movable frame assembly adjacent said first and second ends of said cross member to be extensible from said movable frame assembly to connect with said vehicle side walls.

15. The supplemental tailgate assembly of claim 14 wherein said lock members are telescopically mounted in corresponding first and second hollow tubes supported by said movable frame assembly, each said lock member being pivotable relative to the corresponding said hollow tube to permit positioning of said lock members for engagement with the corresponding said side wall.

16. The supplemental tailgate assembly of claim 14 wherein said lock members comprise rigid, fixed length, elongated rods having a pivot shaft pivotally mounted on a bracket supported in said movable frame assembly such that said lock members are mounted for swinging movement between a stored position within said movable frame assembly and an operative position interconnected with respective said vehicle side walls.

17. The supplemental tailgate assembly of claim 16 wherein each said lock member includes a ball joint connected to said pivot shaft to permit limited vertical movement of said lock member relative to said movable frame assembly, said lock members being swingable from a forward side of said movable frame assembly.

18. The supplemental tailgate assembly of claim 14 wherein said lock members comprise flexible cables pivotally connected respectively to said first and second ends of said cross member, each said flexible cable lock member including a connector member affixed to a distal end of said lock member, said flexible cable lock members and said connector members being stowable within said movable frame assembly.

19. A pickup truck, having a pair of spaced, generally vertical side walls and a generally horizontal bed extending therebetween, each said side wall including a latch pin extending therefrom, comprising:

a tailgate assembly having a tailgate frame pivotally mounted generally between the side walls and being operable between a generally vertical closed position and a generally horizontal open position, said tailgate frame defining a generally hollow cavity therein; and a supplemental tailgate positioned within said hollow cavity and including a movable frame assembly having a pair of extensible supports and a transversely extending cross member interconnecting said supports, said cross member being extendable from said tailgate frame and mounted to be pivotally movable relative to said tailgate frame such that said cross member can be positioned vertically above said tailgate frame when said tailgate frame is in said open position; and a pair of lock members pivotally connected to said movable frame assembly at transversely opposing ends thereof and being movable between a stored position within said movable frame assembly and an operative position interconnecting said movable frame assembly and respective said latch pins on said side walls.

20. The pickup truck of claim 19 wherein said lock members comprise elongated rods having a pivot shaft pivotally mounted on said movable frame assembly such that said lock members are mounted for movement between a stored position within said movable frame assembly and an operative position interconnected with respective said vehicle side walls.

21. The pickup truck of claim 20 wherein said lock members are telescopically mounted in corresponding first and second hollow tubes supported by said movable frame assembly, each said lock member being pivotable relative to the corresponding said hollow tube when telescopically extended to permit positioning of said lock members for engagement with the corresponding said latch pin.

22. The pickup truck of claim 20 wherein said pivot shafts are mounted on a bracket supported in said movable frame assembly such that said lock members are mounted for swinging movement between said stored position and said operative position, each said lock member including a ball joint connected to said pivot shaft to permit limited vertical movement of said lock member relative to said movable frame assembly, said lock members being swingable from a forward side of said movable frame assembly.

23. The pickup truck of claim 20 wherein said lock members comprise flexible cables pivotally connected respectively to transversely opposed first and second ends of said cross member, each said flexible cable lock member including a connector member affixed to a distal end of said lock member.

\* \* \* \* \*

UNITED STATES PATENT AND TRADEMARK OFFICE
CERTIFICATE OF CORRECTION

PATENT NO.        : 7,267,387 B1                                            Page 1 of 1
APPLICATION NO.   : 11/230679
DATED             : September 11, 2007
INVENTOR(S)       : Steve Bruford et al.

It is certified that error appears in the above-identified patent and that said Letters Patent is hereby corrected as shown below:

On the title page item (73), should read:

Ford Global Technologies, LLC         Dearborn, MI

Multimatic, Inc.                      Markham, Ontario, Canada

Signed and Sealed this

Thirteenth Day of May, 2008

JON W. DUDAS
*Director of the United States Patent and Trademark Office*